United States Patent [19]
Campbell

[11] Patent Number: 5,852,711
[45] Date of Patent: Dec. 22, 1998

[54] EFFICIENT PATTERN USE IN PRINTERS

[75] Inventor: Russell Campbell, Boise, Id.

[73] Assignee: Hewlett-Packard Company, Palo Alto, Calif.

[21] Appl. No.: 637,060

[22] Filed: Apr. 24, 1996

[51] Int. Cl.$^6$ .................................................. G06A 15/00
[52] U.S. Cl. ............................................ 395/117; 395/116
[58] Field of Search ................................... 395/117, 115, 395/116; 345/507, 508, 509, 510, 523, 525; 358/404, 444

[56] References Cited

U.S. PATENT DOCUMENTS 5,506,944  4/1996  Gentile ..................................... 395/114

Primary Examiner—Arthur G. Evans

[57] ABSTRACT

A method of operating a digital printer for producing a printed image on a print medium is described. The method is intended for use with a printer which includes at least one memory for holding an overlay pattern bit map which defines an overlay pattern at least portions of which are utilized in printing the printed image onto the print medium, and an image processor for processing 3image data used to produce the printed image. The method includes defining at least one fill area to be printed with at least a portion of the overlay pattern; reading at least a portion of the overlay pattern bit map from said memory; providing at least one boundary point which in part defines a fill area subset which serves to fill a portion of the fill area and define a portion of the printed image appearing therewithin; applying at least a portion of the overlay pattern bit map read from memory to the fill area subset; writing the fill area subset to an output buffer which stores data defining at least a portion of the printed image; and servicing the print mechanism at variable or constant paper slew rate. According to a preferred embodiment, a 3-parameter model is used to determine the incremental image processing cost of pattern processing.

17 Claims, 10 Drawing Sheets

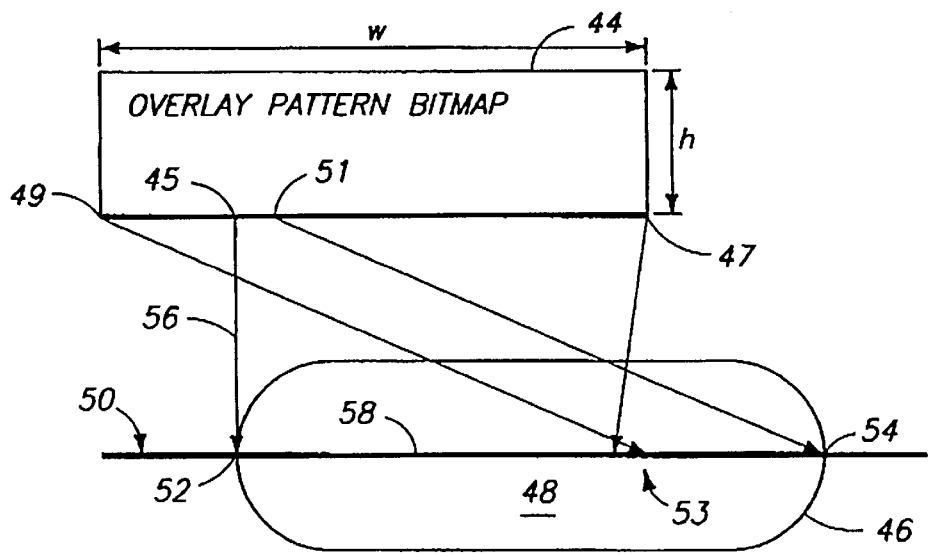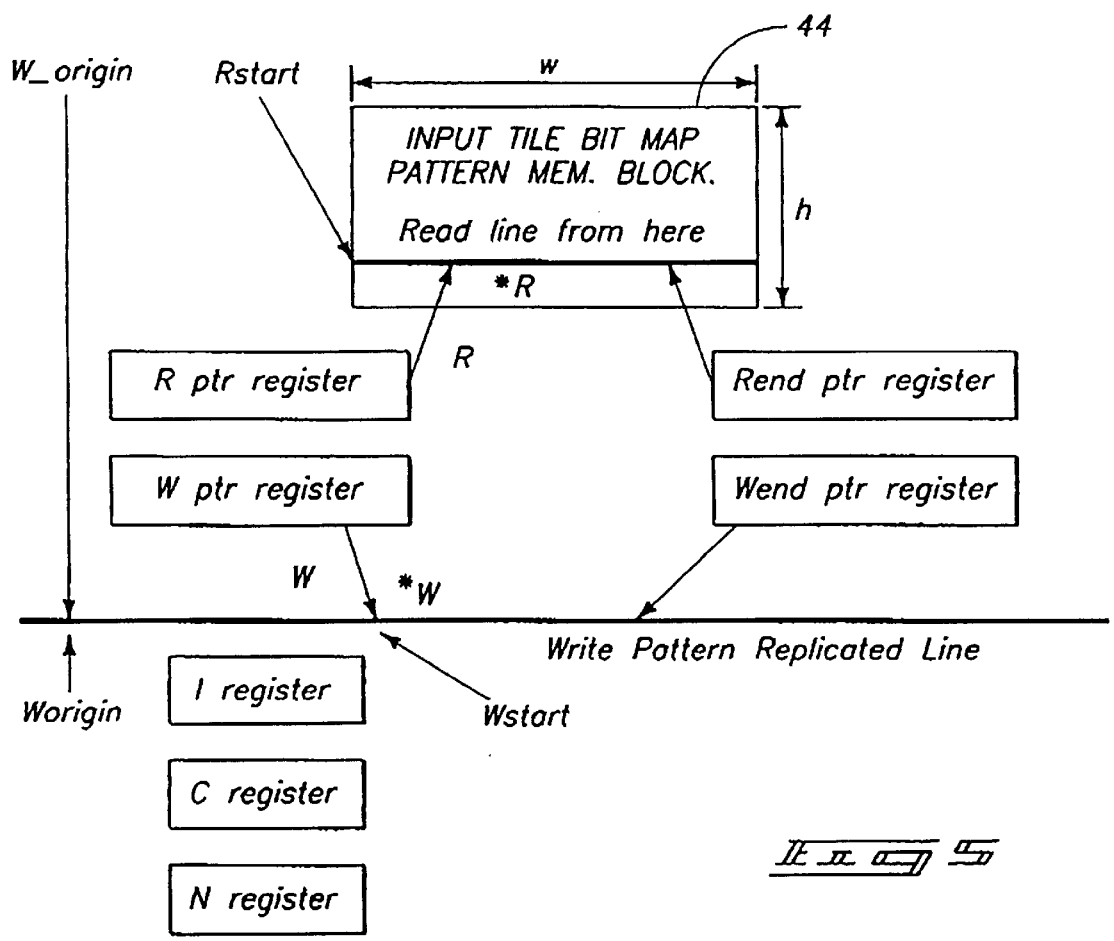

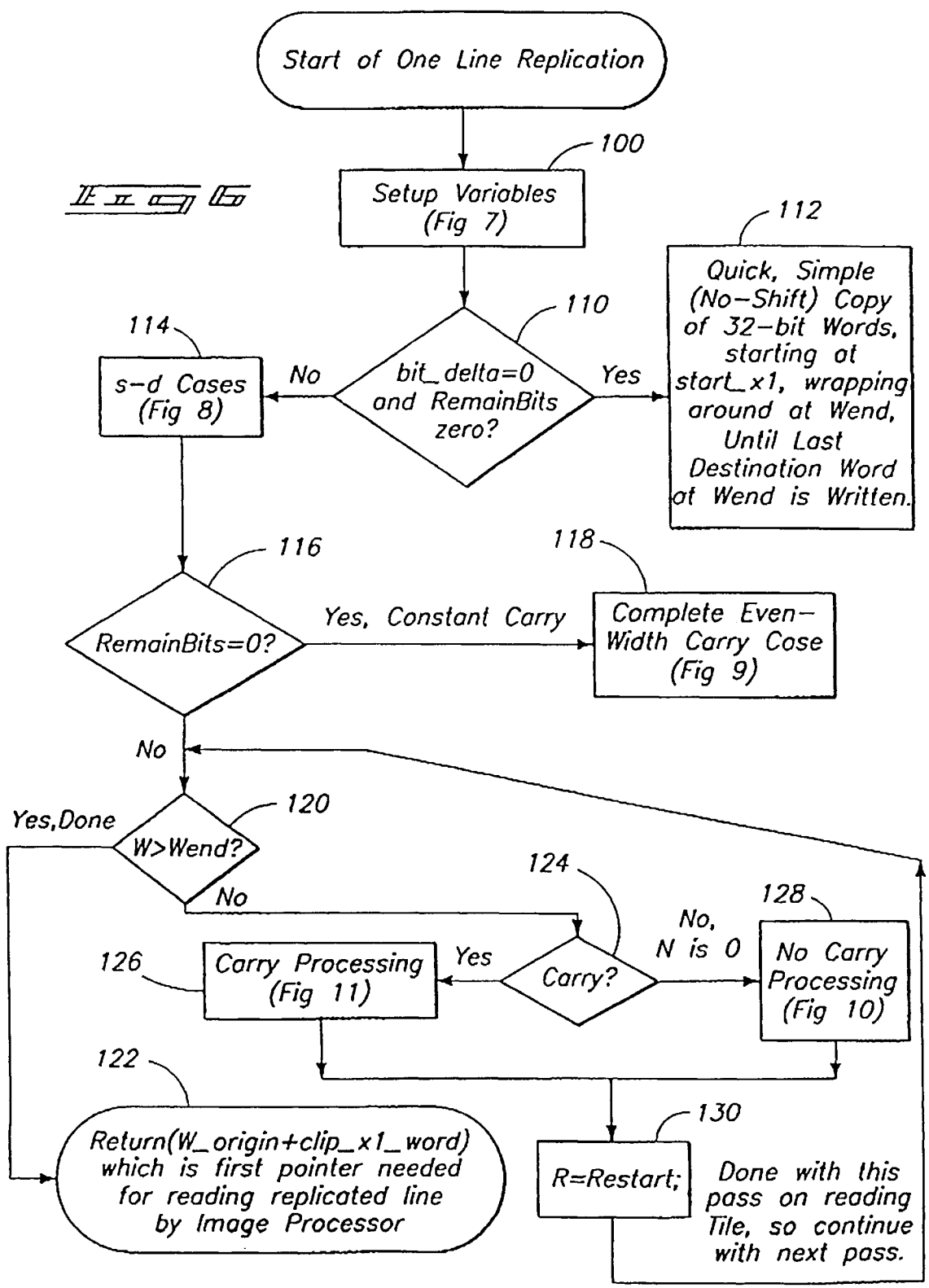

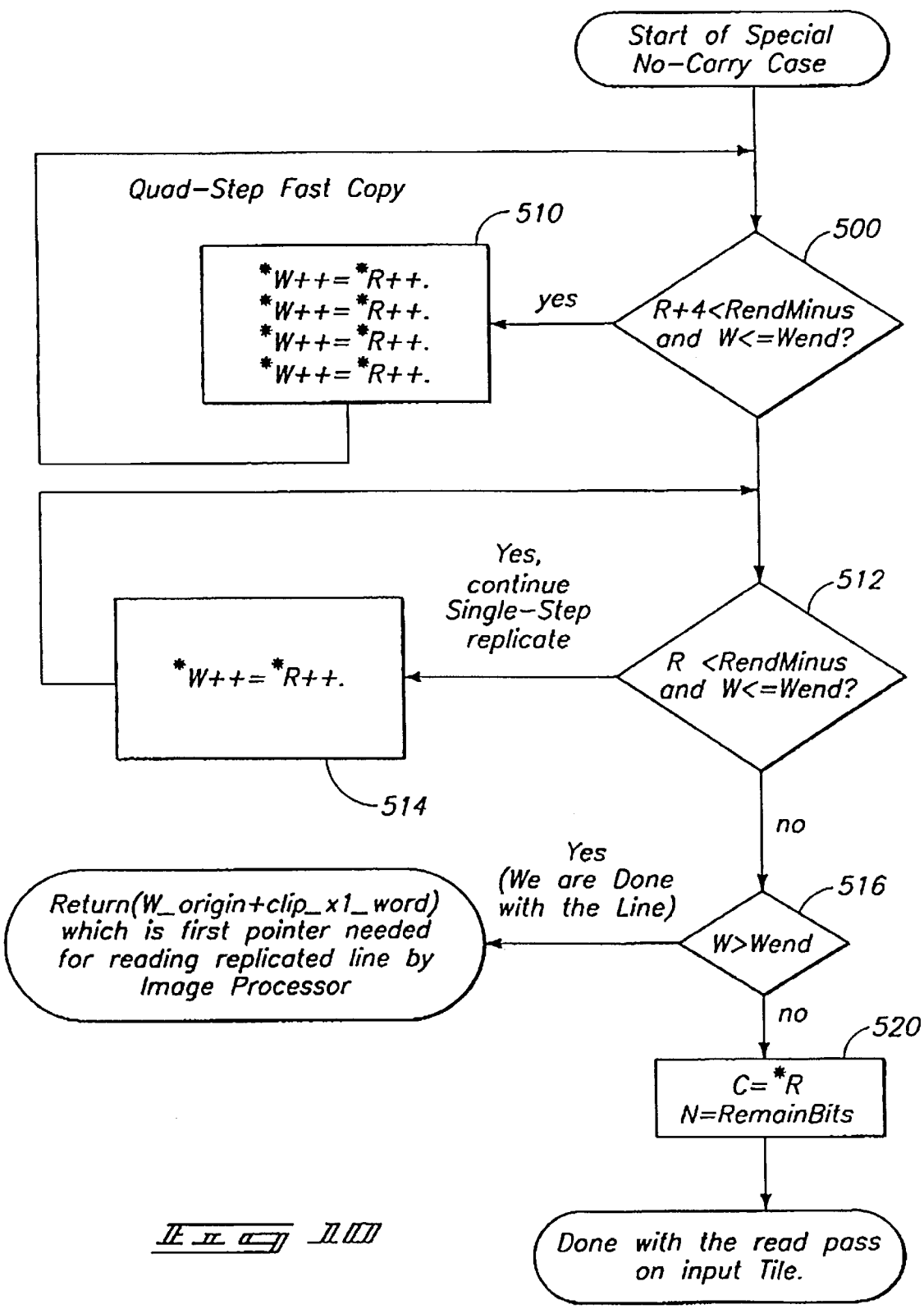

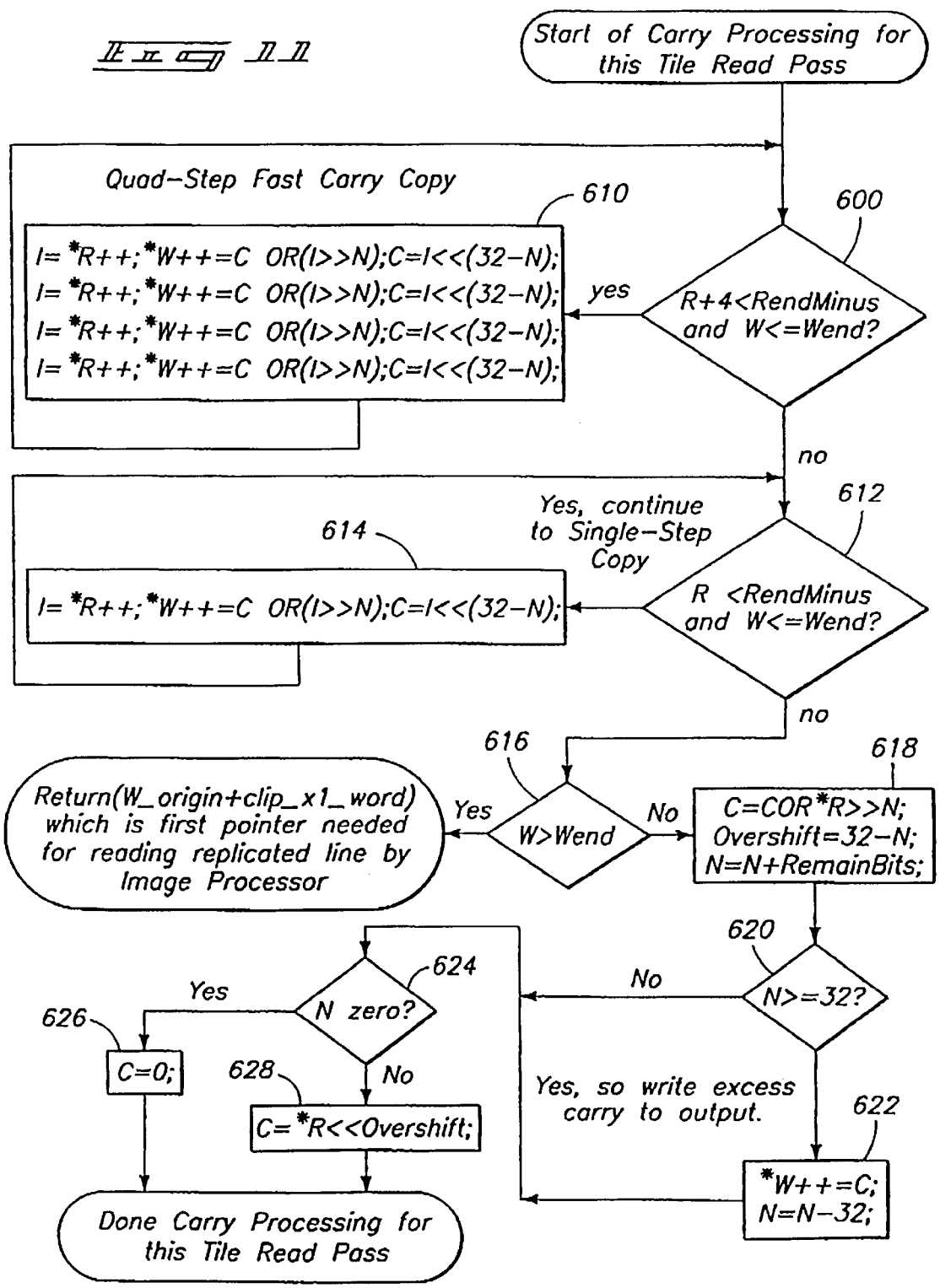

EFFICIENT PATTERN USE IN PRINTERS

FIELD OF THE INVENTION

This invention relates to digital printers, and more particularly, to a method of operating a digital printer to produce a printed image on a print medium.

BACKGROUND OF THE INVENTION

Digital printers are capable of producing full color images with high quality and precision. Such printers are controlled by a printer driver program which provides an interface between an application program running on a host processor and the printer.

Some images produced by printers include patterns. A pattern may be thought of as a background or a filler. A pattern is usually applied to a so-called object or source which appears as part of a printed image on a print medium.

In a printer, patterns are defined by a memory bit map which stores data which defines the "on" or "off" condition of a plurality of pixels forming a pattern. In the past, a memory bit map defining a pattern had to be pre-replicated across a width associated with the width of a page to be printed. This is because the location of a source or object to be patterned was not known. Thus, in order for a pattern to appear in the proper location within an object, the entire memory bit map corresponding to that pattern had to span the entire physical page in width and span vertically a minimum of one pattern tile height. As an example, if a pattern were one-half inch in height, for a 600 dot-per-inch (dpi) printer, roughly 300 lines would have to be replicated across the page, each line being around 6000 pixels in width. For a 1200 dpi printer, the memory requirements are even greater for pre-replicating a bit map. This pre-replicated bit map is also referred to as a pre-tiled pattern. Needless to say, pre-replicating a memory bit map corresponding to a pattern requires large amounts of memory. As a further example, a memory bit map for a 48-pixel wide by 48-pixel high pattern would have to be expanded from 288 bytes to approximately 13 times that amount, or 4K. Similarly, a pattern that was one-inch square would have to be expanded from 45K to about 370K.

This invention arose out of a need to improve the manner in which digital printers produce printed pattern images and reduce the memory usage associated with the production of such patterned images.

SUMMARY OF THE INVENTION

A method of operating a digital printer for producing a printed image on a print medium is described. The method is intended for use with a printer which includes at least one memory for holding an overlay pattern bit map which defines an overlay pattern at least portions of which are utilized in printing the printed image onto the print medium, and an image processor for processing image data used to produce the printed image. The method includes defining at least one fill area to be printed with at least a portion of the overlay pattern; reading at least a portion of the overlay pattern bit map from said memory; providing at least one boundary point which in part defines a fill area subset which serves to fill a portion of the fill area and define a portion of the printed image appearing therewithin; applying at least a portion of the overlay pattern bit map read from memory to the fill area subset; and writing the fill area subset to an output buffer which stores data defining at least a portion of the printed image.

DESCRIPTION OF THE DRAWINGS

FIG. 4 is a diagram which illustrates a pixel-by-pixel copy model which is used to illustrate the concept by which a preferred 32-bit word-copy model operates.

FIG. 5 illustrates various definitional elements which are utilized in implementing the 32-bit word-copy model.

FIG. 6 is a high level flow diagram which illustrates the 32-bit word-copy model.

FIG. 10 is a flow diagram which sets forth a so-called no-carry processing case.

FIG. 11 is a flow diagram which sets forth a so-called carry processing case.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

PRINTER SYSTEM

Figure 1:
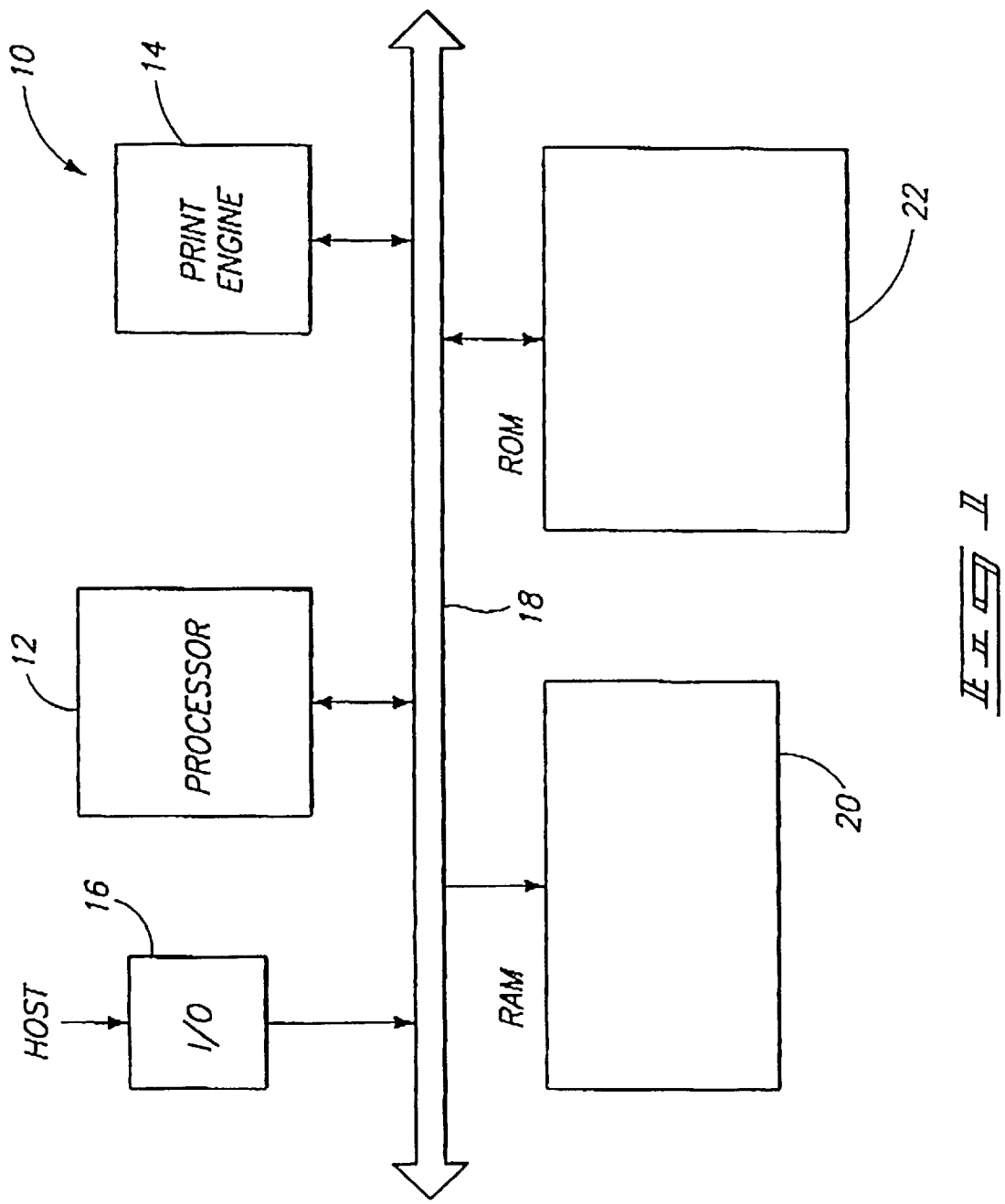
FIG. 1 is a high level block diagram of a printer that is adapted to carry out the invention.

In FIG. 1, digital printer 10 includes a processor 12, print engine 14, and an input/output (I/O) port 16, all connected by a bus 18. Print engine 14 comprises a laser printer which, when operated, runs at a constant speed and must be provided with video raster print data at a rate that keeps up with its operation.

A random access memory (RAM) 20 and a read-only memory (ROM) 22 are also connected to bus 18, and contain procedures and other necessary data to operate the printer, and particularly print engine 14. The operation of printer 10 is set forth in more detail in my U.S. Pat. No. 5,479,587, the disclosure of which is expressly incorporated herein by reference.

The present invention reduces printer memory consumption associated with the printing of a patterned image by determining where a particular pattern needs to appear, producing the correct amount of needed pattern, and then printing such pattern in a desired location on a print medium such as paper anchored to the page as specified by the user. The term "anchor" just used means a user-defined starting point. That is, this invention provides an added degree of flexibility insofar as a particular pattern or patterns could be anchored or pinned so-to-speak anywhere on a page as specified by the user. Subsequently, only needed portions of a pattern are produced and rendered onto the print medium. This completely eliminates the need to pre-replicate a pattern across the entire page as was done in the past, unless the elementary pattern tile width covers the entire page.

Figure 2:
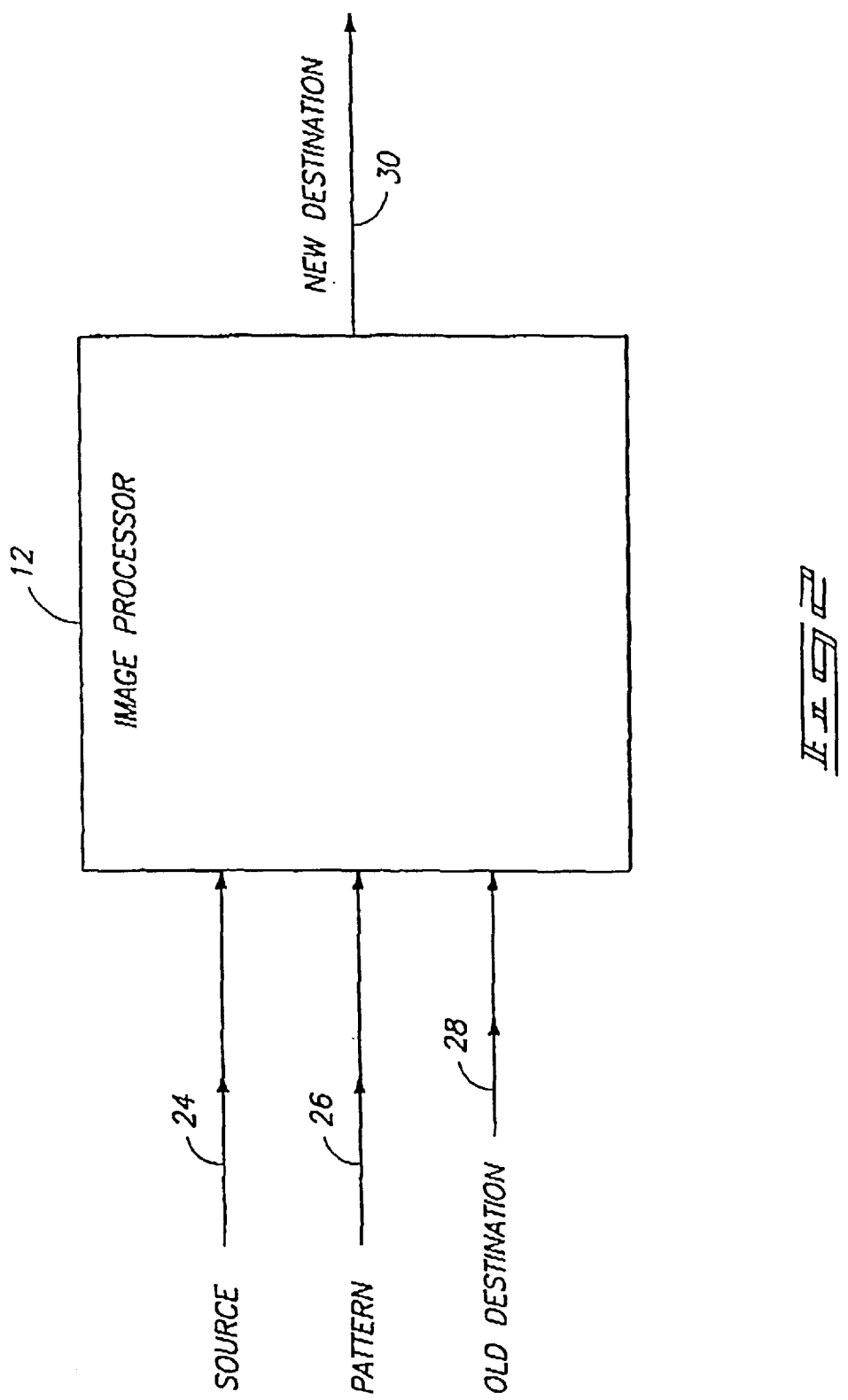
FIG. 2 is a block diagram which illustrates one manner of carrying out the invented method.

FIG. 2 shows a simple block diagram which illustrates one manner in which the above advantage is achieved. More specifically, image processor 12 receives three inputs, a source 24, a pattern 26, and an old destination 28. Source 24 is an abstraction which provides boundary points for an object which is to appear as a printed image on a print medium. The source defines a so-called fill area which is to be filled in with a portion of an overlay pattern. Pattern 26 represents at least a portion of an overlay pattern bit map which defines an overlay pattern. The overlay pattern bit map may reside in the printer's memory and is capable of being read for producing a printed patterned image discussed in more detail below. Old destination 28 represents a so-called strip which is built by the printer and assists the printer in printing a printed image. A destination or strip defines a buffer for holding a plurality of bits which are used to modulate a laser for producing dark or light areas on a printed page as will be understood by those of skill in the art. Processor 12 operates upon source 24, pattern 26, and old destination 28 to define as an output a new destination 30. New destination 30 is an output buffer which stores data which is used by the printer for producing a portion of a printed image on the print medium. It will be understood that the above-mentioned inputs are for purposes of illustrating the invention only are not intended to limit the invention in any way. For example, the above illustrates, as will be understood by those of skill in the art, a raster operation known as ROP3 because of the use of the three inputs. There are, however, other raster operations which utilize other numbers of inputs. The use of such other raster operations in conjunction with the present invention are within the spirit and scope of the invention. Color printing can be accomplished by extension of these monochrome methods.

Figure 3:
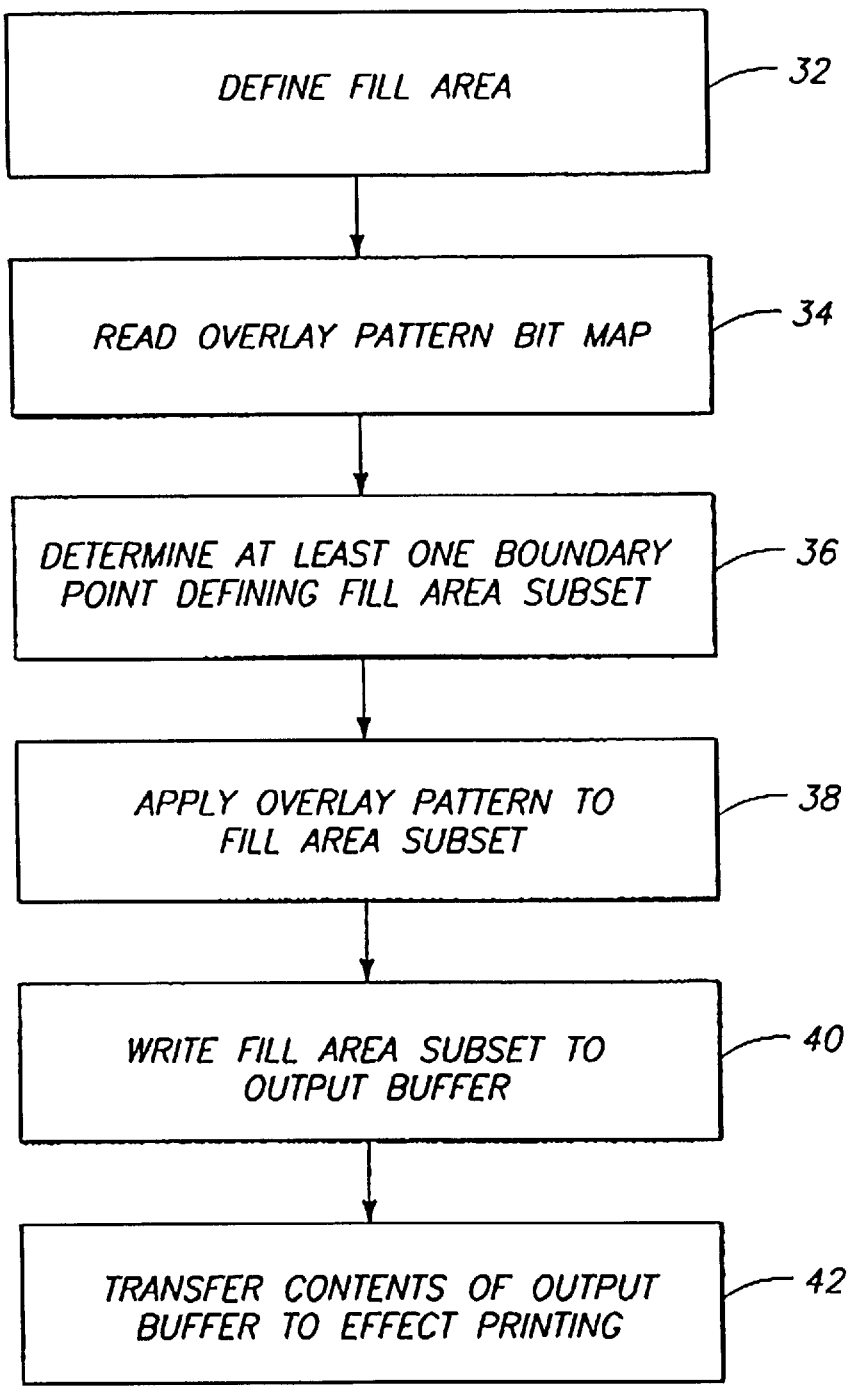
FIG. 3 is a high level flow diagram illustrating a preferred method of implementing the invention.
Figure 7:
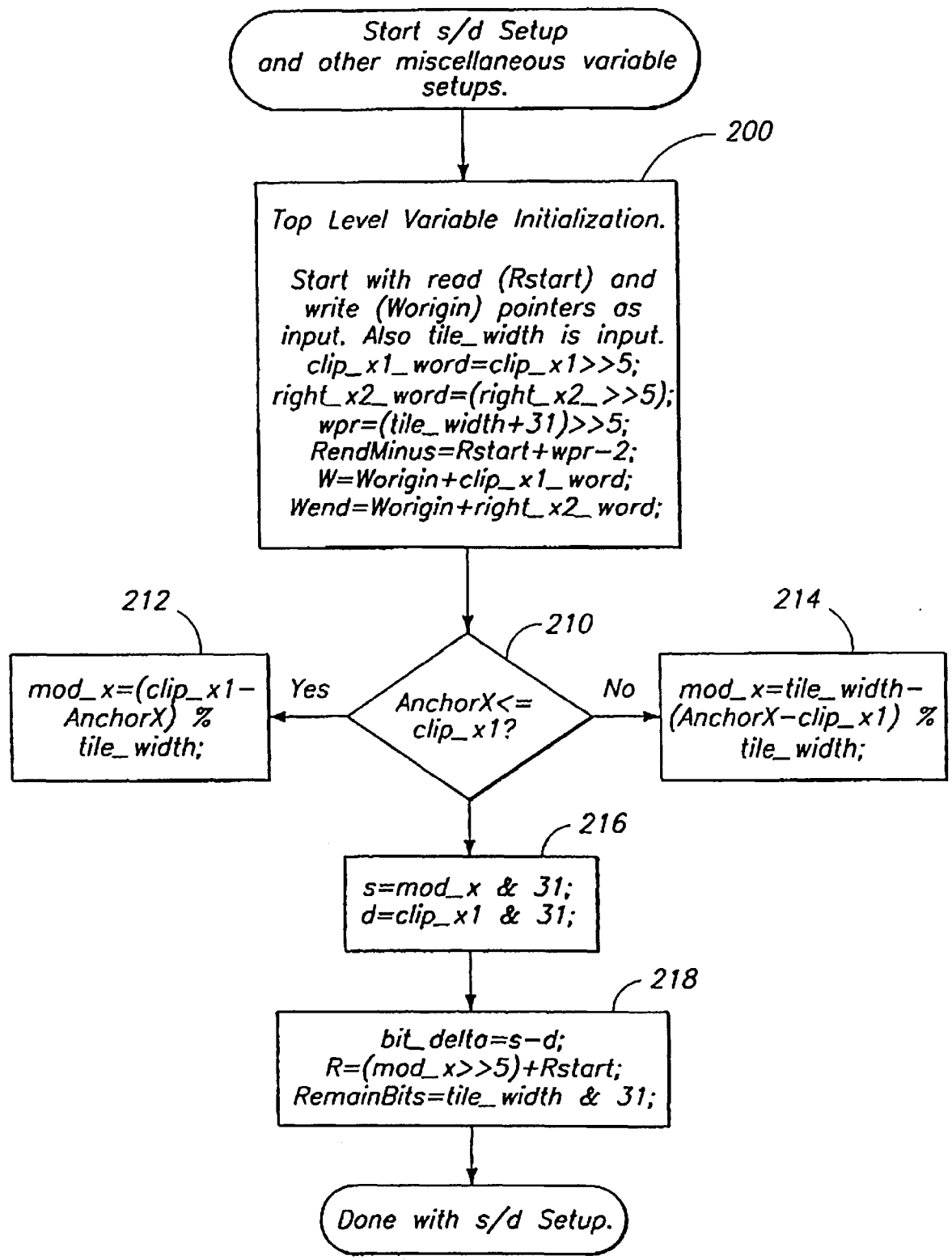
FIG. 7 is a flow diagram which sets forth a variable setup procedure.

FIG. 3 shows a high level block diagram illustrating a preferred method for implementing the current invention. The method includes, at step 32, defining at least one fill area which is to be printed with at least a portion of an overlay pattern. The fill area corresponds to source 24 of FIG. 2 as discussed above. A fill area may have any particular shape when it appears as part of a printed image on a print medium. Such shapes may includes ovals, ellipses, triangles, squares, rectangles or any other suitable shape described by a set of vectors that can adequately define the fill area for purposes of printer operation. The current typical fill area will be defined by a set of one or more vectors which form an enclosed area. Complex shapes with internal holes, such as donut shapes, are first decomposed into elementary geometric shapes without internal holes. It will be understood, however, that such closed shapes are not intended to limit the invention in any way, and that other non-closed shapes defining other sources are within the spirit and scope of the invention. The overlay pattern is defined by an overlay pattern bit map which is stored or held in a memory location such as RAM 20 or ROM 22 in printer 10.

Next, at step 34, a portion of the overlay bit map pattern is read from memory. Preferably, the portion of the overlay pattern bit map which is read is a single line out of the bit map, or at least a portion of a single line. For efficiency purposes, as will be described in more detail below, the portion of a line which is read from the overlay pattern bit map comprises a multi-bit word which is preferably a 32-bit word. At step 36, at least one boundary point, and preferably two are provided, which define a fill area subset. A fill area subset serves to fill a portion of a fill area (which could be and preferably is one horizontal line), and defines a portion of a printed image appearing therewithin. Next, at step 38, the portion of the overlay bit map which was read from memory is applied to the fill area subset. At step 40, the fill area subset containing the applied portion of the overlay bit map is written to an output buffer, also referred to above as new destination 30, which stores data defining at least a portion of the printed image. Finally, at step 42, the contents of the output buffer defined by step 40 are transferred to effect printing of a printed image. It will be understood that the step of transferring the contents of the output buffer includes using the output buffer as a pattern input to the image processor or ROP to effect printing. The process of steps 32–42 are repeated for other subsequent lines in the source until the whole source area is painted or filled with a pattern.

PIXEL-BY-PIXEL COPY MODEL

FIG. 4 illustrates an implementation of the method shown in FIG. 3 on a pixel-by-pixel basis. It is to be understood that FIG. 4 and the following discussion of the pixel-by-pixel copy model are set forth to aid in understanding the 32-bit word-copy model discussed below.

FIG. 4 shows an overlay pattern bit map 44. Bit map 44 has a height h and a width w. Bit map 44 defines an overlay pattern which is used in printing a printed image onto a print medium. A source or object 46 is shown and defines a fill area 48 which is to be printed with a portion of the overlay pattern in a manner directed by the printer control language. As discussed above, source 46 is an abstraction which provides boundary points which define the start and stop points for laying down a pattern. An output line 50 which is one full page width is provided and intersects source 46 at two points 52, 54. Source 46 and output line 50 determine a pair of boundary points 52, 54, which indicate or provide the boundary points between which a portion of a pattern will appear on a printed page. The segment, in this case line segment, between boundary points 52, 54 defines a fill area subset 58 which fills at least a portion of fill area 48. With information of boundary points 52, 54 a pattern component may be built which is used to create the part of the line of the replicated pattern that is needed by the image processor to image the pending line of the source or fill area.

Integral to the concept of displaying or printing the same pattern tile over the area of a source is the concept of an "anchor." The anchor point is sometimes called the pattern origin because it can be thought of as a single point from where the tiles are built in all directions from a central point. At this point, discussion will not be had concerning the details of vertical anchoring since the problem has been broken down to a single horizontal line that must be replicated from the pattern tile or overlay pattern bit map into the single output line 50. The vertical anchoring method was used to choose these particular lines.

Discussing the horizontal anchoring process in more detail, it will be appreciated that the invented method is directed to minimizing the amount of work which must be done by the printer on a particular line. For the purposes of illustration, assume that the tiling process is one where the tiles are stacked vertically directly atop one another. Further assume that the anchor point on a pattern tile is its upper left corner. One can imagine a method that found the first AnchorX point to the right of the source intersection at 52. In FIG. 4, this point is represented by point 53. This is the point to which the pixel from the overlay pattern bit map at point 49 will be copied. Rightward pixels from point 49 of the overlay pattern bit map are copied to the right of 53 on line 50. The pixels to the left of 53 are copied from the rightmost pixels near 47.

The process just described does show how the horizontal AnchorX can be used, but it needs to be optimized for faster left-to-right operation starting at point 52 on the output line and working rightward as fast as possible until the pixel at 54 is copied. Therefore, the preferred implementation is to find which pixel 45 is to be copied to 52 using the appropriate algebraic mapping, and continue rightward reading pixels from the overlay pattern bit map and copying them to the output line 50 until the end at point 47 is reached, whereat reading is wrapped back to the start of the read-line at 49.

Preferably, source 46 is broken into a plurality of fill area subsets such as the one shown at 58, which as shown is a horizontal strip. Such subsets can be defined to run from the top of source 46 to the bottom of source 46. Each fill area subset is defined by a set of boundary points, points and lengths, or other fill area subset definitions which are used for determining where a particular portion of a pattern will appear on a print medium. Each set of boundary points or other definition for a fill area subset are determined and then a corresponding portion of the overlay pattern bit map is applied as described above. In so doing, image data defining a portion of a printed image is produced and written to an output band buffer which is thereafter used by the printer for printing a patterned image on a print medium.

The method described above is advantageous because it provides only that portion of a pattern which is actually needed, and eliminates the need to pre-replicate the whole pattern height across the width of the page. The portion of the needed pattern corresponds to fill area 48 because that is the area which is to hold a portion of the overlay pattern when an image is printed. Furthermore, this method requires printer memory for only one output line 50, whereas previously a memory buffer h times larger (where h is the height of the overlay pattern bit map) was required since every line in the overlay pattern bit map had to be pre-replicated before the paper could move under the laser printing process. This is a substantial savings. For a half-inch high pattern tile, there is a 600-to-1 memory savings at 1200 dpi since there would be 600 lines in the height h to fill a half-inch high pattern.

WORD-COPY MODEL

The pixel-by-pixel copy model discussed above illustrates one concept by which a pattern is printed on a print medium. The following discussion describes a preferred 32-bit word-copy model which is similar in some respects to the pixel-by-pixel copy model. The method is different in some respects because the level of programming complexity increases due to nuances and special requirements associated with copying and writing 32 bits at a time, as will be understood by those of skill in the art.

In order to efficiently process fill area subsets and render a printed, patterned image on a print medium, more than one pixel must be read at a time. FIGS. 5–11 illustrate a system in which 32-bit words are read from overlay pattern bit map 44. It will be appreciated, however, that words having lengths other than 32 bits may be read. Along with reading words having longer lengths, such as 32-bit words, problems arise stemming from the fact that the width of overlay pattern bit map 44 may not be evenly divisible by 32. Additionally, there can be other complications when the coordinate within the first word (known as the s coordinate) from the first word to be read from the overlay pattern bitmap, does not equal the coordinate within the first word (known as the d coordinate) to be written into the destination. These problems are addressed in FIGS. 5 through 11, and discussed below.

Before discussing these problems and one preferred solution to such problems, some basic definitions will be set forth. FIGS. 6–11 set forth basic flow charts which address the above-mentioned problems. The flow charts are described in C programming language which is a widely used and accepted programming language understood by those of skill in the art.

BASIC DEFINITIONS

FIG. 5 shows some basic definitional elements in the form of various registers and pointers utilized to implement one preferred aspect of this invention. In this section, quotation marks are used to identify the various terms which are being identified. In subsequent sections, the quotation marks are excluded. An overlay pattern bit map is shown at 44. Bit map 44 may also be referred to as an input tile bit map or a pattern memory block. As described above, the overlay pattern bit map defines an overlay pattern which is utilized in printing a printed image on a print medium. "W_origin" is a pointer that points to the start of output line 50 following two words of so-called start-up scratch memory. W_origin and other pointers in FIG. 5 are word patterns that point to byte addresses that are evenly divisible by four. "Rstart" points to the start of a line from bit map 44. The "R pointer register" (or "R ptr register" as it appears in FIG. 5) points to the next read-word in the input line. "*R" represents data in memory at the pointer address that is read from the input line. The "W pointer register" (or "W ptr register" as it appears in FIG. 5) points to the next write-word in the pattern replicated line. "*W" represents data in memory at the pointer address that is written to the output line. The "Rend pointer register" (or "Rend ptr register" as it appears in FIG. 5) points to the last word to be read from the input line. The "Wend pointer register" (or "Wend ptr register" as it appears in FIG. 5) points to the last write-word in the pattern replicated line for a particular pass.

The "I register" is a temporary register that holds the 32-bit read-input from memory at "*R". The "C register" is a temporary register that holds carry read-input for a Carry Processing Case discussed below. The "N register" holds num_carry_bits which is the number of bits on the left of the "C register" that are being carried.

Some additional conventions for the C programming language where variables are typed to the 32-bit unsigned integers are as follows. A ">>" sign means shift right and drag zeros from the left. A "<<" sign means shift left and drag zeros from the right. "I>>N" means shift the "I register" rightward by N bits, where N is the contents of the "N register". All variables are considered to be "typed" unsigned, so shift operations always drag zero bits from the side opposite of the direction of the shift. In this (I>>N) case, zero bits are dragged in from the left hand side. Likewise, "I<<N" means shift the "I register" N bits leftward, dragging zero bits in from the right. The "&" signifies the AND logical operation. A "%" is the modulus operation, yielding the simple remainder after a normal integer division.

The use of parentheses force the enclosed operations to be done before any outside operation. As with C, multiplication and division have higher precedence than addition and subtraction. Shifting has lower priority than addition or subtraction, so in most cases a set of parenthesis will surround a Count filed in a shift calculation. For example, "I<<(32−N)" means first subtract the value in the N register from 32, then shift I leftward by that value.

As mentioned above, "R" is the Read pointer, pointing to memory at a 32-bit memory location. "R" may be considered as a memory address. The actual binary value stored at the memory pointed to by "R" is represented by "*R". Thus, "R" is the pointer, and "*R" represents the memory contents. Likewise, "W" is the Write pointer, pointing in memory to a word in memory whose contents will be "*W" after a write operation completes. Thus, "W" is the pointer, and "*W" represents the memory contents that will be written. When a "++" appears after the "*R" or "*W", that means increment the respective pointer by one word after the read or the write operation. The increment on these pointers accomplishes moving the pointers through read and write space quickly. Typically, an "*W" or "*W++" will appear on the left side of an equation, symbolizing what will be written into memory, and an "*R" or "*R++" will appear on the right side of an equation indicating what value will be read from memory. When the logical operator "OR" is used, it means a logical OR bit-by-bit operation on two 32-bit registers, one or more of which may be temporary registers in the CPU. Calculations on the right side of the equal sign are done first, and then the results are put into the register or memory locations symbolized on the left side of the equation. Thus, the equal sign in an equation symbolizes the put operation. For example, X=Y+1 symbolizes the operation of adding one to the Y register (or Y memory value) and then putting the result in the X register (or memory location). When no destination is needed, it and the equal sign are absent. Often, the compiler determines whether a register or a memory location is used to store the value of a register. It is possible in C to request that the compiler use registers for some specified variables. The judicious selection of which variables (or when those variables) should be implemented as registers can sometimes be controlled by optimizing compilers and sometimes controlled by the programmer. With the definitional elements set forth, attention is now directed to FIGS. 6–11 for a more detailed explanation of the 32-bit word-copy model.

FIG. 6 is a flow chart that sets forth in a global manner the 32-bit word-copy model which prepares one line of replicated pattern. Various of the boxes in FIG. 6 branch to other figures (FIGS. 7–11) for a more detailed explanation of the operation performed thereby. For example, box 100 is explained in more detail in FIG. 7 which sets forth a variable set procedure which defines a number of useful variables for a computer program that implements the invention; box 114 is explained in more detail in FIG. 8 which addresses the situation when the first bit within the first read word (s) may or may not match the first writing bit (d) in the destination; box 118 is explained in more detail in FIG. 9 which sets forth the case when a tile width is a multiple of 32 which means that neither the amount of carry nor the amount of shift can change at the end of any read-pass across the input tile; box 128 is explained in more detail in FIG. 10 which sets forth the case when there is no requirement to carry any bits between word reads of the tile width; and, box 126 is explained in more detail in FIG. 11 which sets forth the opposite case where bits are carried upon each read-word operation. In the Carry case, the number of carry bits can accumulate to exceed or equal the number that can be held in the 32-bit Carry register, as shown in FIG. 11.

In the subsequent discussion, the reader will be referred to FIG. 6, and as progression is made through FIG. 6, each of the boxes mentioned above which are the subject of more detailed explanation will be explored as each is encountered in the progression through FIG. 6.

SETUP VARIABLES

The first step in FIG. 6 is shown at box 100 and comprises a variable setup step in which selected variables are defined. These variables are set forth in more detail in FIG. 7, which is a flow chart that sets forth a variable setup procedure. More specifically and referring to FIG. 7, box 200 defines a number of variables. Given the routine inputs, clip_x1 and right_x2, which are inclusive device space pixel coordinates where the source intersects the pending destination line needed, and also given Rstart the starting word pointer, box 200 calculates some useful word-oriented begin/end read and write coordinates and pointers. More specifically, clip_x1_word, right_x2_word, and pointers RendMinus, W and Wend are initialized. At box 210, AnchorX is the coordinate in destination coordinate space where a specified location in the pattern tile is fixed. This position is often the upper left corner of the tile, but it could be any point on the tile. Here, the upper-left corner is used as the point on the tile that is anchored. Referring to boxes 210 through 218, an example using a pixel coordinate of zero for the left-most printable dot on the page is set forth. The specified AnchorX for the pattern and clip_x1 have various wrap-around cases which are simplified by considering the relative coordinates of each in box 210. In either case, boxes 212 and 214 calculate the relative starting position for input tile line reading, mod_x. Then, box 216 calculates the relative bit coordinates within the first 32-bit word for reading and writing which are s and d, respectively. An s value of zero means that the most significant leftward bit in the read word will be used. A bit_delta is calculated at box 218 which is the relative shift in bits between the read and write words. The Read pointer R and RemainBits are also calculated, which are the initial Read pointer and the number of dangling bits on the end of the read tile line. For example, if the tile width is 33, then RemainBits is 1, because 1 bit dangles off of the end of the first word.

Returning to FIG. 6, upon completion of the variable setup step at box 100, at box 110 a test is made to determine if both bit_delta and RemainBits are zero. If both are zero, then at box 112, a simple copy may be done in any number of ways, including using standard copy libraries. This is the simplest case which is a loop of reading and writing 32-bit words until the right-most word of the tile is copied, and repeating the process until sufficient output is generated. One implementation of box 112 could be that shown in FIG. 10 by replacing box 520 with a loop back to above box 500. Sufficient output is generated through a test which is done to determine if the W has advanced beyond the Wend pointer. If, on the other hand, the answer at box 110 is "no", then the method advances to box 114 which is referred to as the s-d cases.

S-D CASES

Figure 8:
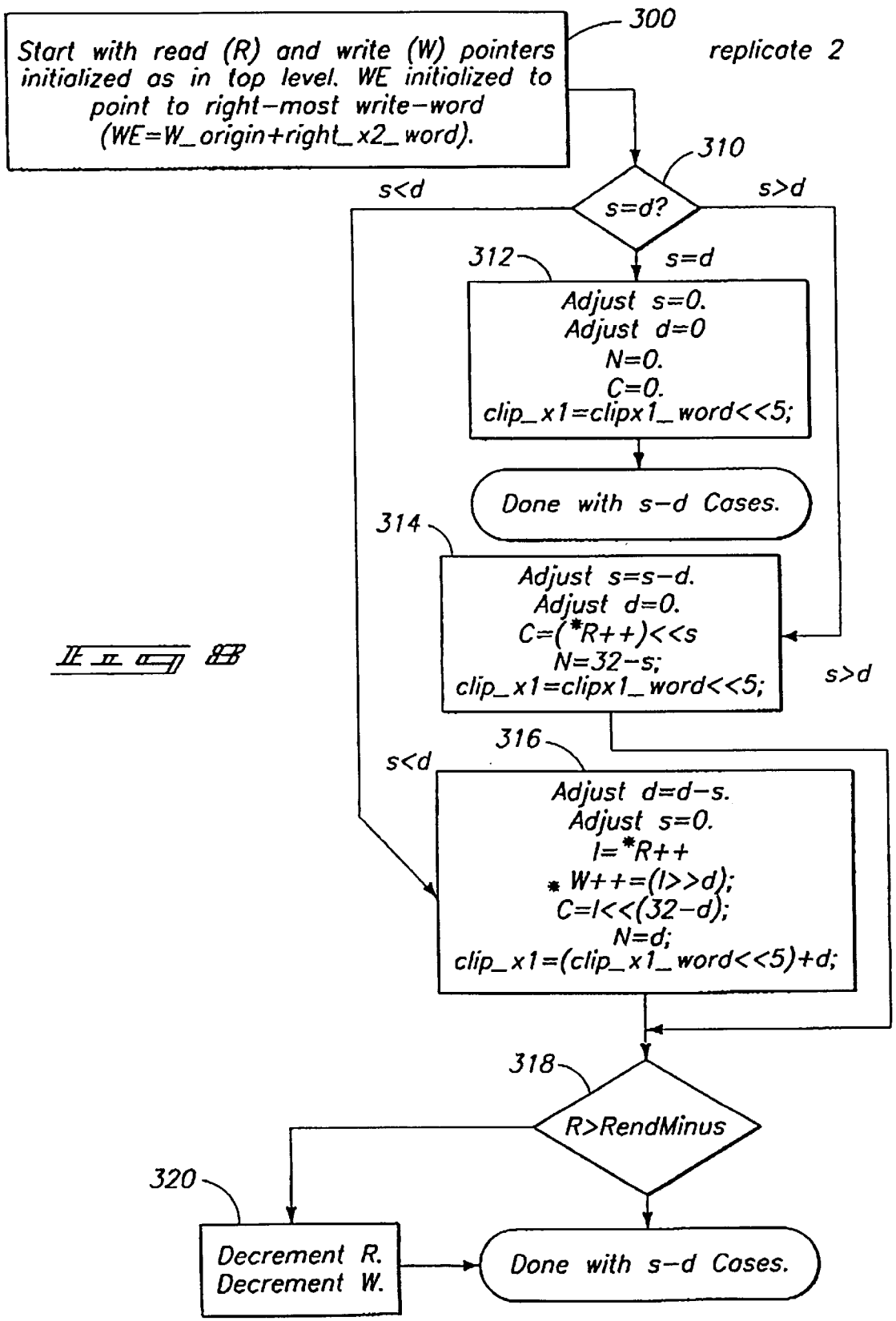
FIG. 8 is a flow diagram which sets forth the so-called s-d cases.
Figure 9:
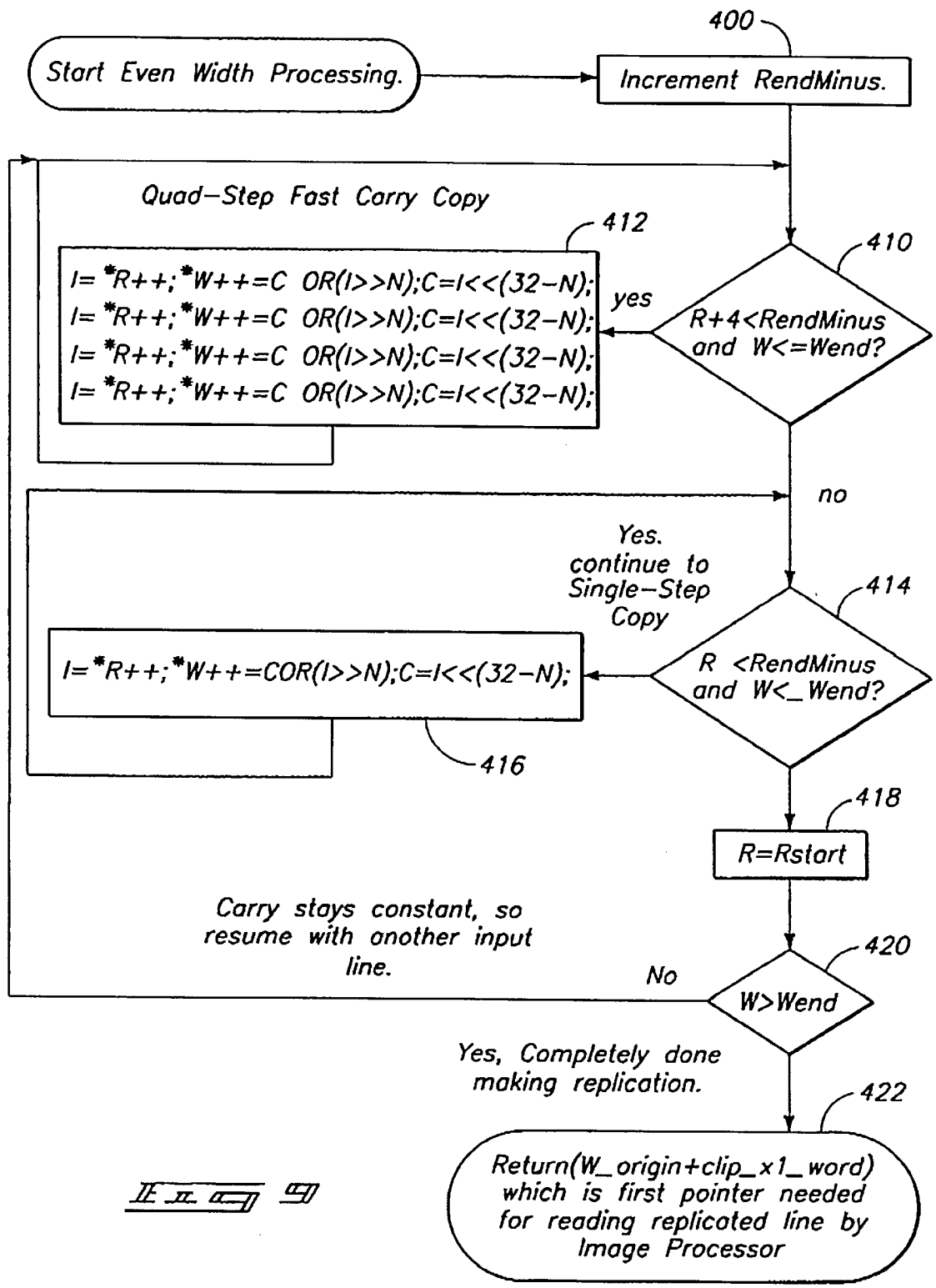
FIG. 9 is a flow diagram which sets forth a so-called even-width carry case.

The s-d cases of box 114 are set forth in more detail in FIG. 8. The calculations set forth in boxes 300 through 320 simplify the starting conditions for processing on a line so that the initial conditions are easier to understand. If the relative starting reading bit s within the first read word matches the first d writing bit number at box 310, then at box 312 the problem is simplified by setting s and d to zero and no other processing is needed other than properly initialing the indicated variables. If, however, at box 310 it is determined that s is greater than d, then at box 314, s is adjusted by the value of d, d is adjusted, and clip_x1 is adjusted to be consistent by clip_x1=(clip_x1_word<<5). The carry register is initialized to C=(*R++)<<s. This means that the word of memory pointed to by R, (e.g. *R) is read, then shifted leftward by the s value, and the result placed in the C register. The ++ indicates that the R pointer is post-incremented. Additionally, the number of carry bits is set to 32-s because that is the number of bits on the left part of the C register that are carried for this case. The right unused bits in the C register are maintained in a zero state.

If at box 310, s is less than d, box 316 adjusts d by the value of s, zeroes s, and recalculates the clip_x1 value as shown. The following steps are then performed: load I from the R pointer, increment R with I=*R++; next, write with *W++=(I>>d), which writes to the address pointed to by W with the value of the I register after being shifted rightward by the d value. Also, initialize C with C=I<<(32−d) which is I shifted leftward by the value (32–d). Finally, set N to be the value of d. At box 318, a check is made to determine if the R pointer is beyond the RendMinus value. If so, a special narrow case adjustment, shown at box 320 is made. If not, the s-d cases are completed.

Referring back to FIG. 6, after box 114, a check is made at box 116 to determine whether RemainBits equals zero. If the answer is "yes", then at box 118 there is an even-tile-width carry case. The complete even-width carry case of box 118 is set forth in more detail in FIG. 9.

EVEN-TILE-WIDTH CARRY CASE

An even-width carry case means that the tile width in pixels is a simple integer multiple of 32. Examples of possible tile widths are 32, 64, 96 . . . pixels in width. Having such a tile width means that neither the amount of carry nor the amount of shift can change at the end of any read-pass across the input tile. These cannot change since there are no dangling bits to change them. Therefore, the contents of the Carry register C will remain invariant while looping, as will the number of carry bits N. A constant C and N make this case relatively simple compared to the Carry case discussed below.

At box 400, RendMinus is incremented to point just beyond Rend, the last word read. This is a simplification that takes advantage of the even read-stop sequence. No advance warning on the read-tile loop is needed because no bits are dangling at the end of the word. After adjusting RendMinus, all reads will be for the condition when R is less than RendMinus or (R<RendMinus). At box 410, a check is made to see if W is less than or equal to Wend and the Read pointer R is far enough to the left so that four words can be read without reading beyond the end of the tile. When there are at least four reads remaining for this pass over the tile width, then at box 412, four very fast read/write combinations are performed. Box 412 is known as a quad-step fast carry copy. It should be understood that empirical or theoretical analysis may be done on the processor and compiler being used to determine if doing quad-steps, such as box 412, speed up or slow down the processing. If the quad-step process slows down the CPU system, then the quad-step process is not used, and single-stepping is done as in box 416. The same analysis applies to other later cases where quad-steps are shown in the flow charts. In some processors with instruction cache, it is possible from theory to select whether quad-steps will speed up the processing. When quad-steps are faster, part of the reason is usually because the cost of the looping overhead for the loop termination is reduced by spreading over multiple operations. When doing quad-step processing such as in box 412, the output can skid beyond Wend by up to three whole words. Therefore, when using the quad-step method, or any extension of the quad-step method, care must be taken to provide extra "skid" write buffer space on the right hand part of the buffer so that the skid can never step on buffers belonging to other logical functions.

Referring more specifically to box 412, each of the steps is exactly the same as a single step in box 416 when we are within 4 words of the right side of the tile. Each step is as follows:

I=*R++; Load I register from memory pointed to by the R pointer register, then increment the R pointer.

*W++=C OR (I>>N); Write to where the write register W points in the destination pattern space the logical OR combination of the C register and the shift right of the I register by N bits, where N is the number of bits that are used in the C or Carry register. The OR function here is a way of combining the top N bits of C with (32-N) bits of the I register. There are other ways of accomplishing this, such as a simple 32-bit unsigned integer ADD of C and (I>>N). An ADD would work since the rightward (32-N) bits of the C register are zero and the leftward N bits of (I>>N) are zero when I is an unsigned register. Thus, the OR function is just one example method of accomplishing the combination of C and (I>>N).

C=I<<(32-N); The new value of the C register is the I register shifted by the value (32-N). At this point, N can never be larger than 31.

If the answer at box 410 is "no", then at boxes 414 and 416, any remaining words of the read operation from this pass on the tile are finished. At box 418, the R pointer register is reloaded to point to the start position on the left of the input tile line at Rstart. At box 420, a check is made to determine if sufficient writing has been accomplished. If not, a loop is made back to the next set of quad-steps at boxes 410 and 412, and/or single steps at boxes 414 and 416. When, at box 420 W>Wend, then at box 422, a value is returned which is the word pointer address that will be used by the image processor to start reading the pattern at the intersection coordinate with the source. This address is (W_origin+clip_x1_word).

Referring back to FIG. 6, at box 116 when RemainBits is not zero, then the processing of loop 120 through 130 must be done which often includes the Carry processing of box 126. For some passes, the conditions can make a No-Carry case shown in box 128. A check of whether carry processing is required is done at box 124 simply by checking the value in the N register. If N is zero, then there are no carry used bits in the C register, and the faster No-Carry processing case can be used. The No-Carry processing case of box 128 is set forth in more detail in FIG. 10.

NO-CARRY PROCESSING

No-Carry processing is simpler than the carry case because there is never the need to carry any bits between reads of the tile width while the R pointer points at full 32-bit words of valid tile input. The organization of quad-steps and single steps (boxes 500 through 514) are the same as for the complete even-width carry case, and the same cautions apply here about determining the relative advantages of incorporating the quad-step optimizations that were discussed previously. Note that at box 514, the input is read from the R pointer (the value being *R), and the output memory location pointed to by W is written (symbolized by *W). Subsequently, both the W and R pointers are incremented as indicated by the ++ post-fix. At box 516, a check is made to see if this particular swath across the tile width has been completed except for the dangling RemainBits part. A check to see if replication is complete is made by comparing the W pointer with the Wend pointer at box 516. If complete, the whole subroutine is exited as before, which would use an immediate return or branch to box 122 of FIG. 6. If the routine is not yet done, then Carry processing resumes at box 520 by loading the C register with the RemainBits that are dangling off the last word of the tile. Also, N is set to equal the RemainBits value.

Returning to FIG. 6, if the answer at box 124 is "yes", then at box 126 Carry processing must be undertaken. The Carry processing pass is set forth in FIG. 11 in more detail.

CARRY PROCESSING

Carry processing is the most complicated case because the number of carry bits can accumulate to exceed or equal the number that can be held in the 32-bit Carry register.

Boxes 600 through 614 are the same as described above for the complete even-width Carry case (boxes 410 through 416). The reader is referred to the discussion above relating to such operation. At box 616, a check is made to determine if writing the output is finished. If the answer at box 616 is yes, then return immediately to box 122 in FIG. 6. If not, then at box 618 new dangling bits are added to the Carry register. At box 618, the next C register is calculated from the old C register bits (of which only N of the left-most ones are significant) which are Ored with the value (*R>>N) in memory at the position pointed to by the R pointer. Then, a value OverShift is assigned the value 32-N for later use. The OverShift is the number of unused bits commencing the processing at box 618. The new N is set equal to the old value+RemainBits because RemainBits is the extra number of bits that must be carried along on the next pass, being the dangling amount that are read from the end of the tile to complete the current pass. At box 620, there are two possible cases. Either N has overflowed beyond 31 bits, or it has not. If the new N is 32 bits, the Carry register is full, and it can be written to memory and cleared immediately. If N exceeds 32, the Carry register must also be written to memory, and new Carry Register is recalculated at box 628. Summarizing, a check is made at box 620 to determine if C will be written at box 622. If C is written at box 622, then N is adjusted appropriately as part of the same operation of box 622 with N=N-32. If N is less than 32 in box 620, then processing continues without writing the Carry register because there is no overflow condition, and the Carry register must be carried into the next Carry processing case on the next swath reading across the input tile. At box 624, a check of N is made. If N is zero, then C at box 626 is set to zero because there is no carry on the next pass. Otherwise, at box 628, the overflow bits are read in by C=*R<<OverShift which places the overflow bits in the left part of the C register, and allows exit to box 130 in FIG. 6. At box 130, a start is made at the left part of the read tile at R=Rstart for the next pass reading the tile back at box 120.

Finally, there is an extension to the method shown that will reduce the image processing work for some cases where the width of the source is sufficiently large (e.g. over a judiciously chosen threshold), and the ROP being used has the effect of simply copying the pattern input directly into the output video band. In this case, it is possible to change the previously explained operation to write directly into the destination video buffer, thus eliminating the image processing step. The algorithm would have to be adjusted so that the skid while stopping was restricted inside the right coordinate. Also, both the start and the end processing would have to be changed to start and stop at the exact pixel coordinates.

COST MODEL

The above-described invention is useful because of the inherent printer memory savings produced thereby. This is because, unlike prior systems, a pattern need not be pre-replicated across an entire page width. Because of this, valuable memory is saved. It will be understood that certain digital printers, such as laser printers, move a print medium such a paper, through the printing process at a constant speed. This speed is maintained from start to finish. Thus, in the past, it became convenient to pre-replicate a pattern across an entire page width to ensure that the printer, and particularly the laser, had enough work to do. By doing this, one was assured that the printer would not run out of work thereby producing a so-called punt which may be thought of as a work outage. Consequently, it became commonplace to build up the printer work before starting the paper on its print journey. Once enough work was built up, the paper was started on its print journey.

With the current invention, pattern processing takes place in real time while racing the laser. Racing the laser requires making a determination regarding how to get the best trade off between printer memory and real time processing requirements.

One disadvantage of performing pattern replication while racing the laser is that this process costs Image Processor time. If the incremental cost is too high, it could cause the Image Processor to lose the race with the Output Video Task, resulting in what is known as a print overrun or punt. Such misprints can be avoided by optimizing the speed of pattern processing and by pre-rasterizing any video band buffers that would cause a print overrun. Following is a discussion of how to accurately determine which video strips need to be pre-rasterized, thus eliminating the possibility of punts without wasting memory by pre-rasterizing too many video bands.

It is common to think of the real time printing process in a laser printer as a race between two tasks. In a properly working printer, there is never a print overrun because the Image Processor task just manages to win every race with the DMA output task. It is undesirable to avoid print overruns by unilaterally pre-rasterizing every video band because (even with compression) that consumes too much precious printer memory for video DMA buffers. One process has been developed to permit minimization of the number of pre-rasterized video buffers and is disclosed in U.S. Pat. No. 5,129,049 to Cuzzo et al., the disclosure of which is expressly incorporated herein by reference. This was extended for compression and empirical Image Processor cost measurements in U.S. Pat. No. 5,479,587 to Campbell et al.

The preferred model discussed just below is directed to providing a means for ensuring that the minimum number of video DMA band buffers are pre-rasterized so that the Image Processor Task can just win every race with the video DMA without using an excess of printer memory.

Next follows the preferred cost model for pattern processing according to the present invention. It provides an accurate and straight forward model designed to achieve the best balance between memory usage and punt-avoidance:

$$Cost = Overhead + (ObjectWidth * WidthCost) + (Replications * ReplicationCost)$$

The above model considers three parameters: Overhead, Width Cost, and Replication Cost. The model assesses on a line-by-line (fill area subset-by-fill area subset) basis the real time processing requirements for the purpose of identifying which lines, strips, or fill area subsets need prerasterization to avoid a print overrun or so-called punt. Overhead is a parameter which takes into account the overhead time requirements associated with the operation. The Width Cost parameter (the product of the ObjectWidth and the WidthCost) takes into account the amount of time associated with processing an object having a particular width. The Replication Cost parameter (the product of Replications and ReplicationCost) takes into account the time associated with looping decisions. The three parameters are determined by empirical measurements on word-case scenarios, avoiding the faster paths described previously. Extensions could be made to account for the improvements for the fast paths, but that is usually unnecessary except as a means to avoid a memory-out condition in the printer. According to the above model, the costs generated may be used to determine which strips need to be prerasterized to avoid a print overrun. Such may be conveniently determined through a comparison of the generated cost with a known threshold.

In addition to determining which strips require pre-rasterization, the model may be used to provide a trade-off between pre-rasterization and pre-tiling. For example, the maximum source or fill area to which a pattern is to be applied would be recorded while a particular page is being built. The maximum width is the width that would be used for pre-tiling. In many cases, this width would be substantially less than the physical page width. Therefore, even in the case where pre-tiling would be used, the memory requirements would sometimes be substantially less in most complex pages.

Thus, the above cost model assists the present invention in racing the laser or staying ahead of the laser operation during the preparation of a pattern for printing on a print medium.

VECTOR PATTERN

The previous discussion required a bit map pattern memory block 44. In some cases the rectangular bit map may be described by a set of vector fill commands. If the set of vector fill commands is sufficiently simple, it is possible to skip the preparation of the pattern memory block, and make the Write Pattern Replicated Line directy by extending the same types of begin-skip-repeat steps that are previously taught. Such a vector fill pattern is included as one of the different means of applying this invention.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of operating a digital printer for producing a printed image on a print medium; said printer including at least one memory for holding an overlay pattern bit map which defines an overlay pattern at least portions of which are utilized in printing the printed image onto the print medium, and an image processor for processing image data used to produce the printed image, the method comprising:
   a. defining at least one fill area to be printed with at least a portion of the overlay pattern;
   b. reading at least a portion of the overlay pattern bit map from said memory, said portion comprising a plurality of bits;
   c. providing at least one boundary point which in part defines a fill area subset; said fill area subset serving to fill at least a portion of the fill area and define a printed image appearing therewithin said reading of said overlay pattern bit map comprising using said at least one fill-area-subset-defining boundary point to determine whether a starting bit to be read from the overlay pattern bit map matches a first writing bit in said fill area subset, and if not, adjusting at least one of the starting bits and the writing bits so each matches the other;
   d. applying said at least a portion of the overlay pattern bit map read from memory to said fill area subset; and
   e. writing said fill area subset to an output buffer which stores data defining at least a portion of the printed image.

2. The method of claim 1 further comprising determining if the time required to process a fill area subset exceeds a pre-defined threshold, and if so, pre-rasterizing said fill area subset.

3. The method of claim 1 further comprising determining if the time required to process a plurality of fill area subsets comprising a fill area exceeds a pre-defined threshold, and if so, pre-rasterizing fill area subsets which exceed said pre-defined threshold.

4. The method of claim 1, wherein said fill area subset is defined by two boundary points and said at least a portion of the overlay pattern bit map read from memory is dimensioned to fit generally within said boundary points when applied to said fill area subset.

5. The method of claim 1, wherein said fill area comprises a plurality of fill area subsets; and steps b-e are performed on at least most of said fill area subsets to define a fill area containing at least a portion of the overlay pattern.

6. The method of claim 1, wherein said fill area comprises a plurality of fill area subsets and at least most of the fill area subsets are defined by two boundary points; and steps b-e are performed on at least most of said fill area subsets to define a fill area containing at least a portion of the overlay pattern.

7. The method of claim 1 further comprising transferring the contents of said output buffer to effect printing of at least a portion of the printed image.

8. The method of claim 1, wherein said fill area comprises a plurality of fill area subsets; and steps b-e are performed on at least most of said fill area subsets to define a fill area containing at least a portion of the overlay pattern; and further comprising transferring the contents of said output buffer to effect printing of at least a portion of the printed image.

9. The method of claim 1, wherein said fill area comprises a plurality of fill area subsets and at least most of the fill area subsets are defined by two boundary points; and steps b-e are performed on at least most of said fill area subsets to define a fill area containing at least a portion of the overlay pattern; and further comprising transferring the contents of said output buffer to effect printing of at least a portion of the printed image.

10. The method of claim 1, wherein said fill area subset comprises a line which extends through said at least one fill area.

11. The method of claim 1, wherein said reading step comprises reading at least one multi-bit word from the overlay pattern bit map.

12. The method of claim 1, wherein said reading step comprises reading at least a portion of a 32-bit word.

13. The method of claim 1 further comprising using said output buffer as an input pattern line into the ROP image processor operation to produce a destination bitmap that will be printed or displayed.

14. The method of claim 1 further comprising estimating an image processor cost associated with preparation of a set of output pattern lines on a video band.

15. The method of claim 1 further comprising using an estimate model as part of a model for image processing costs to determine whether particular video bands require pre-rasterization to avoid a print overrun condition.

16. The method of claim 1 wherein said output buffer comprises a destination video buffer.

17. The method of claim 1 wherein said overlay pattern bit map memory is replaced by a set of vector fill commands.

* * * * *